UNITED STATES PATENT OFFICE.

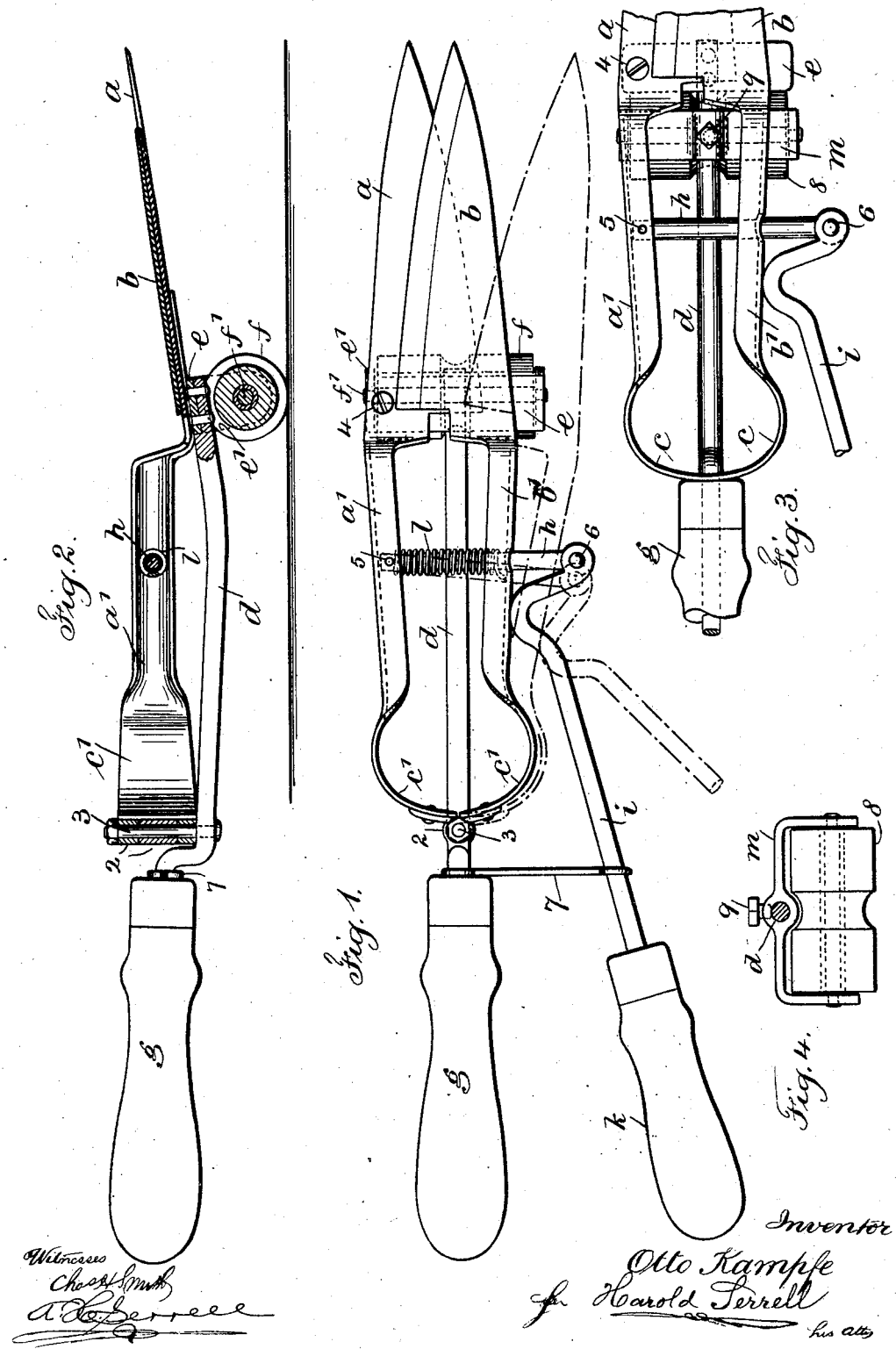

OTTO KAMPFE, OF NEW YORK, N. Y.

LAWN-TRIMMER.

No. 859,665.  Specification of Letters Patent.  Patented July 9, 1907.

Application filed June 30, 1906. Serial No. 324,114.

*To all whom it may concern:*

Be it known that I, OTTO KAMPFE, a citizen of the United States, residing at the borough of Brooklyn, in the county of Kings, city and State of New York, whose post-office address is No. 8–12 Reade street, New York city, New York, have invented an Improvement in Lawn-Trimmers, of which the following is a specification.

My invention relates to an improvement in grass shears or implements for trimming the edges of lawns, flower-beds and other places inaccessible to the lawn-mower, and the same as a garden implement is usually employed after the work of the lawn-mower is complete, and the object of my invention is to provide a simple device operated by both hands and in which the weight of the implement is not supported by the hands and also in which a lever is employed for relieving the pressure usual upon the hands.

In carrying out my invention I attach one blade of a grass shears and the spring bow thereof to a rigid member having a handle, and I employ a pin pivoted to one handle of the grass shears and passing freely through the other handle, and a lever pivoted to the free end of this pin and adapted to bear against the outer surface of a handle of a grass shears to force the handles and the blades toward one another to perform the cutting function. This lever is to be provided with a handle complementary to the handle upon the rigid member, and the rigid member is preferably provided with a roller adapted to bear upon the surface of the ground and maintain the shears at a predetermined height controlled by the diameter of the roller, or the nearness of the same to the shears.

The bow member of the grass shears may be divided and the parts hinged together, in which event I provide a helical spring around the pin and between the handles to maintain an open condition of the blades.

In the drawing, Figure 1 represents a plan view of the preferred form of my lawn trimmer, Fig. 2 is a vertical longitudinal section and elevation of the parts shown in Fig. 1, Fig. 3 is a broken plan view representing the simpler form of my invention and Fig. 4 is a cross section and elevation of the adjustable roller carrying device shown in Fig. 3.

The grass shears comprise the blades $a$ $b$, the integral arms $a'$ $b'$ and a bow spring $c$. Usually the blades, the arms and the spring are made in one piece and in Fig. 3 I have shown so much thereof as comprises a bow spring and arms, while in Figs. 1 and 2 I have shown the bow member as made in two parts $c'$ $c'$ with hinge leaves 2 and a hinge pin 3, but it is to be understood that I do not limit myself to either manner of making the grass shears. The rigid member is composed of a bar $d$ of any desired shape in cross section and a plate $e$ riveted thereto at the forward end and occupying a transverse relation thereto. The respective ends of the plate $e$ are downwardly outturned as lugs $e'$ and perforated to receive the axis $f'$ of a roller $f$ as shown in Figs. 1 and 2.

$g$ represents the handle of the rigid member; the same being connected to the bar $d$ in any desired manner well known in this art. Where the bow member is composed of the two parts $c'$ $c'$ as shown in Figs. 1 and 2, it is preferable to pass the lower end of the hinge pin 3 through the bar $d$ so as thereby to form a rigid connection between the bow member of the grass shears and the bar $d$ of the rigid member.

The blade $a$ of the grass shears is to be rigidly secured by a screw 4 to the plate $e$ of the rigid member, thus leaving the blade $b$ and the arm $b'$ free to be moved, and for this purpose I provide a pin $h$ which passes freely through an opening in the arm $b'$ and is pivoted to the arm $a'$ by a pin 5. To the outer or free end of the pin $h$ a lever $i$ is pivotally connected by a pin 6. This lever $i$ is provided with a handle $k$, the lever portion being in the form of a crook or hook end, the curved surface of which is adapted to bear upon the outer surface of the arm $b'$.

In Fig. 1 I have shown the blade $b$ in its open position in dotted lines and the lever $i$ also in dotted lines in its open position, therefore the swinging of the lever $i$ by its handle $k$ in moving the handles $g$ $k$ toward one another when grasped in the hands effects or produces the movement of the blades of the grass shears, bringing the same together to cut the intervening blades of grass.

In the simpler form of my invention shown in Fig. 3, the bow spring $c$ normally holds the blades $a$ $b$ in their open position, therefore the action of the lever $i$ and handle $k$ is against the spring tension of the bow to keep the same open, and when the lever is released the blades open by virtue of the spring action, but the temper of these bow springs cannot always be depended upon as they are liable to weaken and the parts become set in a closed or partly closed position, therefore in the preferred form of my invention I divide the bow portion into two parts, as hereinbefore described, connected by a hinge and employ a helical spring $l$ surrounding the pin $h$ between the arms $a'$ $b'$. This helical spring is much more liable to maintain its tension and it serves to open up the blades $a$ $b$ immediately upon the release of the lever $i$ and being substantially in the line of movement of the lever and handles at the pin $h$, the movement is more reliable and is less tiresome to the hands.

I have shown in Figs. 1 and 2, and prefer to employ a hook 7 pivoted to the bar $d$ adjacent to the handle $g$ and adapted to engage and hold the lever $i$ and its handle $k$ in a position of nearest approach to the handle $g$ in compacting the parts for transportation.

In the simpler form of my invention in Fig. 3, the bar $d$ of the rigid member is bent forward of the bow spring $c$ and passed through the bow spring into the handle $g$.

As a substitute for the roller $f$ and its support in Figs. 1 and 2, I prefer as shown in Figs. 3 and 4, to provide the plate $e$ without lugs secured to the blade $a$ in the same manner, and to provide a roller 8 in a yoke frame $m$ adapted to slide along upon the bar $d$ of the rigid member and to be clamped thereto by a set screw 9; said roller being mounted in said yoke frame by a suitable axis and adapted to be moved along the bar $d$ either towards the handle $g$ or towards the blades $a$ $b$ according to the height it is desired the blades of the grass shears shall be from the surface of the ground, as it is quite apparent that when the roller is nearer to the blades, the blades will be at their maximum height above the surface of the ground in the position in which the implement would be held in the hand, and also that if the roller is nearer the handle, the blades will be at their minimum distance from the ground as the implement will be held by the hands, it being of course understood that it is desirable in the use of the implement to hold the same so that the blades $a$ $b$ in their length are as nearly as possible parallel with the surface of the ground.

I am aware that heretofore grass shears have been mounted upon a roller or wheel and have been provided with two long pivoted handles, one connected to each shear arm by means of which the operator or user may stand in an upright position while working the implement. This structure however, is different from mine and I do not claim the same in any respect.

I claim as my invention:

1. A lawn-trimmer comprising shears, their arms and connecting member, a rigid member to which the one shear blade and the connecting member are secured, a handle terminating the rigid member, a pin pivoted to one arm of the shears and passing freely through an opening in the other arm and a lever pivotally connected to the free end of the pin and adapted to bear on the surface of one arm of the shears to actuate the same.

2. A lawn-trimmer comprising shears, their arms and connecting member, a rigid member to which the one shear blade and the connecting member are secured, a handle terminating the rigid member, a pin pivoted to one arm of the shears and passing freely through an opening in the other arm, a lever pivotally connected to the free end of the pin and adapted to bear on the surface of one arm of the shears to actuate the same, and a handle forming a termination to the lever and a hook 7 secured to the rigid member and adapted to engage the lever for holding the parts in closed relation.

3. A lawn-trimmer comprising shear blades, arms and a connecting member, a rigid member comprising a bar secured to the connecting member of the shear arms, a handle terminating the rigid member at one end and a plate secured to the other or free end of the bar and at right angles thereto, means for connecting one shear blade to one end of the said plate, a pin passing freely through one shear arm and pivotally connected to the other shear arm, a lever pivotally connected to the free end of the pin and having a hook portion adjacent thereto and adapted to bear upon the outer surface of the adjacent shear arm to force the arms and the blades together for operating the trimmer.

4. In a lawn-trimmer, the combination with the blades and their arms, of a curved member in two parts, hinge leaves and a hinge pin connecting the same together, a rigid member comprising a bar secured to the two-part curved member, a handle terminating the bar at one end and a plate at right angles to the bar secured thereto at the other end, a device securing one shear blade to said plate at one end, a pin passing freely through an opening in one shear arm and pivotally connected to the other shear arm, a helical spring surrounding said pin between the arms and a lever pivotally connected to the free end of said pin and adapted to bear upon the outer surface of the adjacent shear arm.

5. In a lawn-trimmer, the combination with the blades and their arms, of a curved member in two parts, hinge leaves and a hinge pin connecting the same together, a rigid member comprising a bar secured to the two-part curved member, a handle terminating the bar at one end and a plate at right angles to the bar secured thereto at the other end, a device securing one shear blade to said plate at one end, a pin passing through an opening in one shear arm and pivotally connected to the other shear arm, a helical spring surrounding said pin between the arms and a lever pivotally connected to the free end of said pin and adapted to bear upon the outer surface of the adjacent shear arm, said lever being formed with a crook or curved portion where the same bears upon the shear arm and terminating in a handle to be grasped by the hand.

Signed by me this 26th day of June 1906.

OTTO KAMPFE.

Witnesses:
 GEO. T. PINCKNEY,
 E. ZACHARIASEN.